United States Patent
Schall et al.

(10) Patent No.: US 10,240,608 B2
(45) Date of Patent: Mar. 26, 2019

(54) TIAL ALLOY, IN PARTICULAR FOR TURBOCHARGER APPLICATIONS, TURBOCHARGER COMPONENT, TURBOCHARGER AND METHOD FOR PRODUCING THE TIAL ALLOY

(71) Applicant: BorgWarner Inc., Auburn Hils, MI (US)

(72) Inventors: Gerald Schall, Bobenheim-Roxheim (DE); Daniela Cempirkova, Bolanden (DE); Steffen Bereswill, Niedermohr (DE); Frank Scherrer, Frankenthal (DE); Menno Roder, Kirchheimbolanden (DE); Juergen Strelbitski, Orbis (DE); Michael Loewenberg, Bolanden (DE); Adnan Adilovic, Mainz (DE); Dominik Kuss, Kirchheim (DE); Stefan Eisinger, Bornheim (DE); Achim Klein, Kaiserslautern (DE)

(73) Assignee: BorgWarner Inc., Auburn Hills, MI (US)

( * ) Notice: Subject to any disclaimer, the term of this patent is extended or adjusted under 35 U.S.C. 154(b) by 202 days.

(21) Appl. No.: 15/115,948

(22) PCT Filed: Feb. 3, 2015

(86) PCT No.: PCT/US2015/014207
§ 371 (c)(1),
(2) Date: Aug. 2, 2016

(87) PCT Pub. No.: WO2015/119927
PCT Pub. Date: Aug. 13, 2015

(65) Prior Publication Data
US 2017/0167497 A1    Jun. 15, 2017

(30) Foreign Application Priority Data
Feb. 5, 2014 (DE) .................. 10 2014 202 036

(51) Int. Cl.
*C22C 1/02* (2006.01)
*C22F 1/18* (2006.01)
*C22C 14/00* (2006.01)
*F02B 37/00* (2006.01)
*F04D 25/04* (2006.01)
*F04D 29/02* (2006.01)

(52) U.S. Cl.
CPC .............. *F04D 29/023* (2013.01); *C22C 1/02* (2013.01); *C22C 14/00* (2013.01); *C22F 1/183* (2013.01); *F02B 37/00* (2013.01); *F04D 25/04* (2013.01); *F05D 2220/40* (2013.01); *Y02T 10/144* (2013.01)

(58) Field of Classification Search
CPC ........ F04D 29/023; F04D 25/04; F02B 37/00; C22C 1/22; C22C 14/00; C22F 1/183
See application file for complete search history.

(56) References Cited

U.S. PATENT DOCUMENTS

2011/0189026 A1    8/2011    Smarsly et al.

FOREIGN PATENT DOCUMENTS

| JP | 01-79335 | * | 3/1989 |
|---|---|---|---|
| JP | 06-299276 | * | 10/1994 |
| JP | H06299276 A | | 10/1994 |
| JP | 10193087 A | | 7/1998 |
| JP | 2000345259 A | | 12/2000 |
| JP | 2011236503 A | | 11/2011 |

OTHER PUBLICATIONS

Translation for JP 06-299276, Oct. 25, 1994.*
International Search Report and Written Opinion; dated Apr. 30, 2015 ; for International Application No. PCT/US2015/014207; 11 pages.

* cited by examiner

*Primary Examiner* — C Melissa Koslow
(74) *Attorney, Agent, or Firm* — BrooksGroup

(57) ABSTRACT

A TiAl alloy comprising the elements C, Si, B, Al and Ti, wherein a C fraction is ≤0.5 wt %, an Si fraction is 0.05-2.5 wt %, a B fraction is ≤0.4 wt % and an Al fraction is 25-43 wt %, in each case in relation to the total weight of the alloy.

18 Claims, 5 Drawing Sheets

Figure 1:
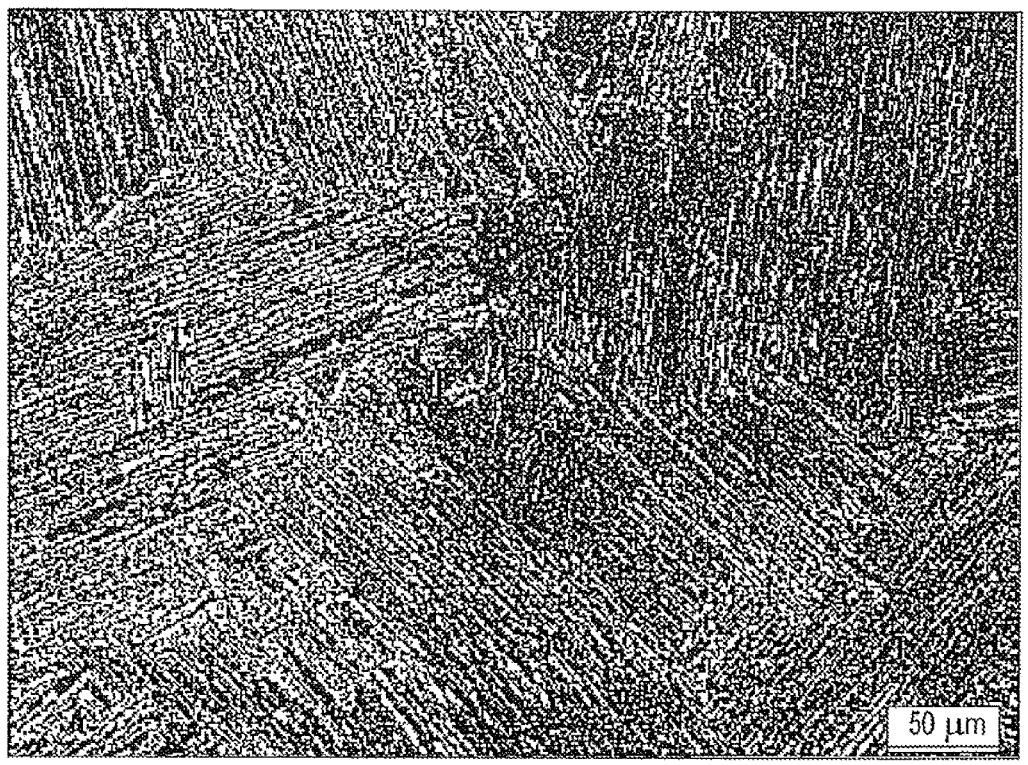

TIAL ALLOY, IN PARTICULAR FOR TURBOCHARGER APPLICATIONS, TURBOCHARGER COMPONENT, TURBOCHARGER AND METHOD FOR PRODUCING THE TIAL ALLOY

The invention relates to a TiAl alloy, to a turbocharger component, and in particular a turbine rotor in particular for diesel engines and to a method for producing the TiAl alloy.

TiAl alloys are materials with good mechanical durability which, owing to their characteristics, are used as high-temperature materials. Conventional TiAl materials however exhibit only inadequate thermal fatigue performance and creep resistance. Specifically these characteristics are advantageous in particular for exhaust-gas turbocharger components. Exhaust-gas turbochargers are systems for increasing the power of piston engines. In an exhaust-gas turbocharger, the energy of the exhaust gases is used to generate an increase in power. The power increase results from the fact that the mixture throughput per working cycle is increased.

It is therefore an object of the present invention to provide a TiAl alloy which is characterized by very good mechanical stability, improved thermal fatigue performance and increased creep resistance, and which is therefore particularly suitable for turbocharger applications. It is a further object of the invention to provide a turbocharger component and in particular a turbine rotor and also a turbocharger with improved mechanical characteristics for the intended application, and in particular with improved thermal fatigue performance and increased creep resistance. Furthermore, it is a further object of the invention to specify a method for producing a TiAl alloy, which method can be implemented easily and inexpensively without high outlay in terms of technology.

According to the invention, the object is achieved by a TiAl alloy comprising the elements carbon (C), silicon (Si), boron (B), aluminum (Al) and titanium (Ti), wherein a C fraction is ≤0.5 wt %, an Si fraction is 0.05-2.5 wt %, a B fraction is ≤0.4 wt % and an Al fraction is 25-43 wt %, in each case in relation to the total weight of the alloy. Within the context of the invention, a TiAl alloy is to be understood to mean an alloy which, in addition to the stated elements and possibly further additives, comprises titanium and aluminum as main constituents, wherein the titanium constitutes a balancer and serves for equilibration in the alloy. Titanium is preferable owing to its low specific weight, and in the alloy according to the invention, forms intermetallic compounds with the element aluminum such as, for example, TiAl and $Ti_3Al$ which introduce good durability and high mechanical toughness into the TiAl alloy. In this case, at the same time, the element aluminum improves the ductility and yield stress of the alloy material. To be able to form the intermetallic TiAl phases, the aluminum fraction must be at least 25 wt % in relation to the overall weight of the alloy, such that there is adequate aluminum available for bonding to the main alloy constituent, titanium. To obtain the desired mechanical characteristics which predestine the alloy material for use as a high-performance material, addition of the elements C, Si and B is essential. In this case, the carbon has a positive influence on the strength of the alloy and is conducive to an improvement in creep resistance. In the case of high fractions above 0.5 wt %, however, the ductility of the alloy material is adversely affected. An addition of silicon is likewise advantageous for improving creep resistance, wherein specifically the elements carbon and silicon in combination interact in synergistic fashion. Furthermore, an addition of silicon improves the oxidation resistance of the alloy and, owing to the lowering of the viscosity of the alloy material during the casting process, facilitates the production of the alloy according to the invention. The addition of boron has, in combination with C and Si in the TiAl alloy according to the invention, a positive effect on the ductility of the alloy material. Furthermore, boron increases the high-temperature stability and thermal fatigue resistance. In fractions of up to 0.4 wt % in relation to the overall weight of the alloy, boron furthermore improves the microstructure stability of the alloy at high temperatures, which predestines the TiAl alloy according to the invention in particular for use in high-temperature applications. The TiAl alloy according to the invention can be produced by different methods, for example by a casting process and subsequent hot isostatic pressing and heat treatment, or by a powder metallurgical process or MIM (metal injection molding) with subsequent hot isostatic pressing and heat treatment. By means of the element combination according to the invention comprising C, Si and B in a matrix of Ti and Al, a very highly temperature-resistant material with high strength, good oxidation resistance, very good creep resistance and thermal fatigue performance is provided which is suitable for the production of, in particular, components which are subjected to high temperatures and which are subjected to high mechanical loads.

In an advantageous refinement of the TiAl alloy according to the invention, the C fraction is ≤0.4 wt %, the Si fraction is 0.08-2.2 wt %, the B fraction is ≤0.3 wt % and the Al fraction is 28-39 wt %, in each case in relation to the total weight of the alloy. In this way, the mechanical characteristics and in particular the creep resistance and thermal fatigue performance of the alloy can be further improved.

It is also advantageous for the TiAl alloy to furthermore comprise niobium (Nb), wherein an Nb fraction is 0.1-8.0 wt %, preferably 0.15-6.5 wt %, in relation to the total weight of the alloy. The addition of the element niobium has the characteristic of improving the oxidation resistance of the TiAl alloy, similarly to the addition of silicon. A combination of the elements Si and Nb therefore has a particularly positive effect on the high-temperature oxidation resistance of the alloy, without the need to accept disadvantages as a result of excessively high contents of Si or Nb respectively. The content of Nb may in this case be in a range from 0.1 to 8.0 wt %, but with regard to maximizing the oxidation resistance of the alloy, is preferably 0.15 to 6.5 wt %.

A further advantageous refinement provides that the TiAl alloy furthermore comprises chromium (Cr) and/or vanadium (V) and/or molybdenum (Mo), wherein a Cr fraction is 0.1-4.0 wt %, preferably 0.15-3.5 wt %, and/or a V fraction is ≤2.0 wt %, preferably ≤1.7 wt %, and/or an Mo fraction is ≤1.4 wt %, preferably ≤1.2 wt %, in each case in relation to the total weight of the alloy. An addition of chromium in the stated quantities is conducive to improving ductility and increasing the yield stress at elevated temperatures. The addition of vanadium has the effect of increasing the ductility, elasticity at high temperatures and the high-temperature yield stress. In the alloy according to the invention, molybdenum has proven to improve the creep resistance and strength of the alloy. A combination of the elements Cr, V and Mo in the stated quantities in the alloy according to the invention serves to realize a particularly balanced spectrum of characteristics of the alloy material, and in particular, is conducive to improving the high-temperature resistance thereof.

In a particularly preferred embodiment, the TiAl alloy is composed of Ti, Al, C, Si, B, Al, Mo, Cr, V and Nb, wherein a C fraction is ≤0.5 wt %, an Si fraction is 0.05-2.5 wt %, a B fraction is ≤0.4 wt %, an Al fraction is 25-43 wt %, an Nb fraction is 0.1-8.0 wt %, a Cr fraction is 0.1-4.0 wt %, a V fraction is ≤2.0 wt %, and a Mo fraction is ≤1.4 wt %, in each case in relation to the total weight of the alloy, and titanium is used for equilibration as a so-called remainder, or as a balancing element. The TiAl alloy described above is characterized by a fully lamellar microstructure in which the lamellae of the material engage into one another and overlap in the manner of teeth. This yields an alloy with very good stability, that is to say high thermal stability, and good mechanical stability, which is distinguished in particular by very good creep resistance and thermal fatigue performance. The material is resistant to oxidation, even at high temperatures, and furthermore exhibits high strength and a high yield stress. The stated alloy material is particularly well-suited to high-temperature applications such as are encountered for example in the case of turbocharger components.

The TiAl alloy is furthermore advantageously subjected to heat treatment and hot isostatic pressing. This promotes the formation of a lamellar microstructure in the alloy structure, which is conducive to improving the mechanical characteristics of the alloy material.

A further advantageous refinement provides that an average grain size in the TiAl alloy is 1 to 3 μm. As a method for measuring the grain size, use is made of the relevant ASTM standard test method. In this way, a homogeneous alloy structure with very good overlapping lamellar regions of the Ti—Al phases is attained, which has a positive effect on the mechanical characteristics of the alloy material.

The TiAl alloy according to the invention is particularly advantageously characterized in that it has a lamellar structure and a spacing between the lamellae is ≤1.5 μm, preferably ≤1 μm. This promotes and optimizes the intermeshing of the lamellae, such that a particularly stable microstructure is attained. In this case, the lamellae spacing can be set through suitable selection of the alloy constituents and method parameters during the production of the alloy.

Likewise described according to the invention is a turbocharger component, in particular a turbine rotor, which is composed of the TiAl alloy described above. Owing to the composition of the alloy material, the turbocharger component is characterized by very good durability, high mechanical toughness and also in particular good thermal fatigue performance and creep resistance. Said characteristics are essential in particular for a turbine rotor, because this is subjected to very high mechanical and thermal loads.

A turbocharger may comprise at least one component, in particular a turbine rotor, which is composed of a TiAl alloy comprising the elements C, Si, B, Al and Ti, wherein a C fraction is ≤0.5 wt %, an Si fraction is 0.05-2.5 wt %, a B fraction is ≤0.4 wt % and an Al fraction is 25-43 wt %, in each case in relation to the total weight of the alloy. Owing to the TiAl alloy used for producing at least one component of the turbocharger, the turbocharger according to the invention is characterized by very good thermal and mechanical durability. The creep resistance and thermal fatigue performance of the turbocharger are very good, with simultaneously high oxidation resistance.

The advantages, advantageous effects and refinements described with regard to the TiAl alloy according to the invention can also be applied to the turbocharger component according to the invention and to the turbocharger according to the invention. For the description of the turbocharger according to the invention, reference is therefore additionally made to the above description regarding the TiAl alloy according to the invention.

In an advantageous refinement of the turbocharger according to the invention, in the TiAl alloy, the C fraction is ≤0.4 wt %, the Si fraction is 0.08-2.2 wt %, the B fraction is ≤0.3 wt % and the Al fraction is 28-39 wt %, in each case in relation to the total weight of the alloy. In this way, the mechanical characteristics of the turbocharger and in particular its thermal fatigue performance and creep resistance are improved.

It is also advantageous for the TiAl alloy to furthermore comprise Nb, wherein an Nb fraction is 0.1-8.0 wt %, preferably 0.15-6.5 wt %, in relation to the total weight of the alloy. The oxidation resistance of the TiAl alloy is improved through the addition of the element niobium. In particular, a combination of the elements Si and Nb has a particularly positive effect on the high-temperature oxidation resistance of the alloy, without the need to accept disadvantages as a result of excessively high contents of Si or Nb respectively. The content of Nb may in this case be in a range from 0.1 to 8.0 wt %, but with regard to maximizing oxidation resistance, is preferably 0.15 to 6.5 wt %.

The turbocharger according to the invention is furthermore advantageously characterized in that the TiAl alloy furthermore comprises Cr and/or V and/or Mo, wherein a Cr fraction is 0.1-4.0 wt %, preferably 0.15-3.5 wt %, and/or a V fraction is ≤2.0 wt %, preferably ≤1.7 wt %, and/or an Mo fraction is ≤1.4 wt %, preferably ≤1.2 wt %, in each case in relation to the total weight of the alloy. As already stated, an addition of chromium in the stated quantities is conducive to improving ductility and increasing the yield stress at elevated temperatures. The addition of vanadium increases the ductility, elasticity at high temperatures and the high-temperature yield stress, and molybdenum is used for improving the creep resistance and strength of the alloy. A combination of the elements Cr, V and Mo in the stated quantities for producing an alloy for at least one turbocharger component of the turbocharger according to the invention serves to realize a particularly balanced spectrum of characteristics, and in particular, is conducive to improving the high-temperature resistance of the turbocharger.

It is particularly advantageously the case that the TiAl alloy is composed of Ti, Al, C, Si, B, Al, Mo, Cr, V and Nb, wherein a C fraction is ≤0.5 wt %, an Si fraction is 0.05-2.5 wt %, a B fraction is ≤0.4 wt %, an Al fraction is 25-43 wt %, an Nb fraction is 0.1-8.0 wt %, a Cr fraction is 0.1-4.0 wt %, a V fraction is ≤2.0 wt %, and a Mo fraction is ≤1.4 wt %, in each case in relation to the total weight of the alloy, and Ti is used as a remainder, that is to say for equilibration of the alloy and thus as a balancing element. The turbocharger according to the invention with the one or more turbocharger components formed from the TiAl alloy described above is characterized by a fully lamellar microstructure in which the lamellae of the material engage into one another and overlap in the manner of teeth. The turbocharger is thus characterized in particular by very good stability, that is to say high thermal stability and also mechanical stability, and also in particular by very good creep resistance and thermal fatigue performance. The turbocharger is resistant to oxidation, even at high temperatures, and furthermore exhibits high strength and a high yield stress.

The advantageous refinement that the TiAl alloy is subjected to heat treatment and hot isostatic pressing has the effect of improving the formation of a lamellar microstructure in the alloy structure, which is conducive to optimizing the mechanical characteristics of the turbocharger.

The TiAl alloy for producing the turbocharger component of the turbocharger according to the invention advantageously has an average grain size of greater than 2 μm and/or a lamellar structure, wherein a spacing between the lamellae is ≤1.5 μm, preferably ≤1 μm. In this way, a homogeneous alloy structure with very good overlapping lamellar regions of the Ti—Al phases with good intermeshing is attained, which has a positive effect on the mechanical characteristics of the alloy material.

Likewise specified according to the invention is a method for producing a TiAl alloy as described above, which method comprises the following steps:

melting the alloy elements to form an alloy material,
subjecting the alloy material to heat treatment, and
subjecting the alloy material to hot isostatic pressing.

By means of the method steps stated here, it is possible in a simple and inexpensive manner, using standard processes, to produce a TiAl alloy with Ti—Al phases which is characterized by a lamellar structure with very good intermeshing and thus by excellent thermal and mechanical stability, and in particular increased creep resistance and thermal fatigue performance.

The advantages, advantageous effects and refinements described with regard to the TiAl alloy according to the invention, the turbocharger component according to the invention and the turbocharger according to the invention can also be applied to the method according to the invention for producing the TiAl alloy.

An advantageous refinement of the method according to the invention provides that the heat treatment comprises the following steps:

heating the alloy material to approximately 1260° C. within two hours,
holding the alloy material at a temperature of approximately 1260° C. for three hours, and
cooling the alloy material in a nitrogen inert gas atmosphere to a temperature of 650° C. with a cooling rate of 7 K/sec.

In this way, the thermal fatigue performance and creep resistance of the alloy material can be optimized.

Figure 2:
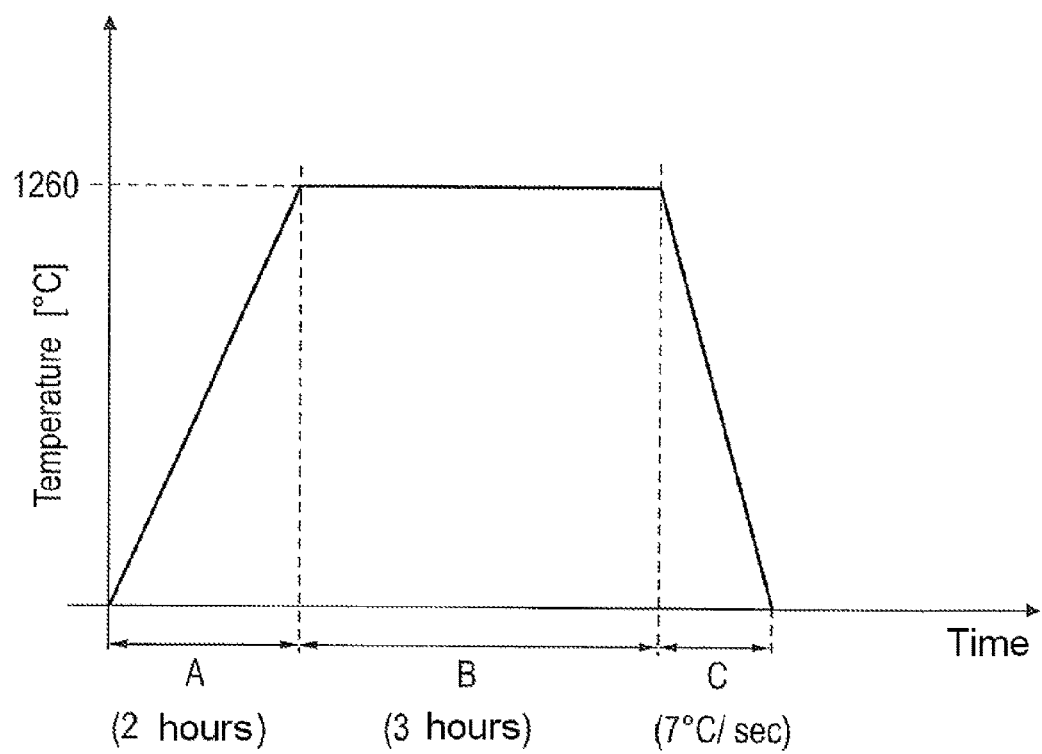
Figure 3:
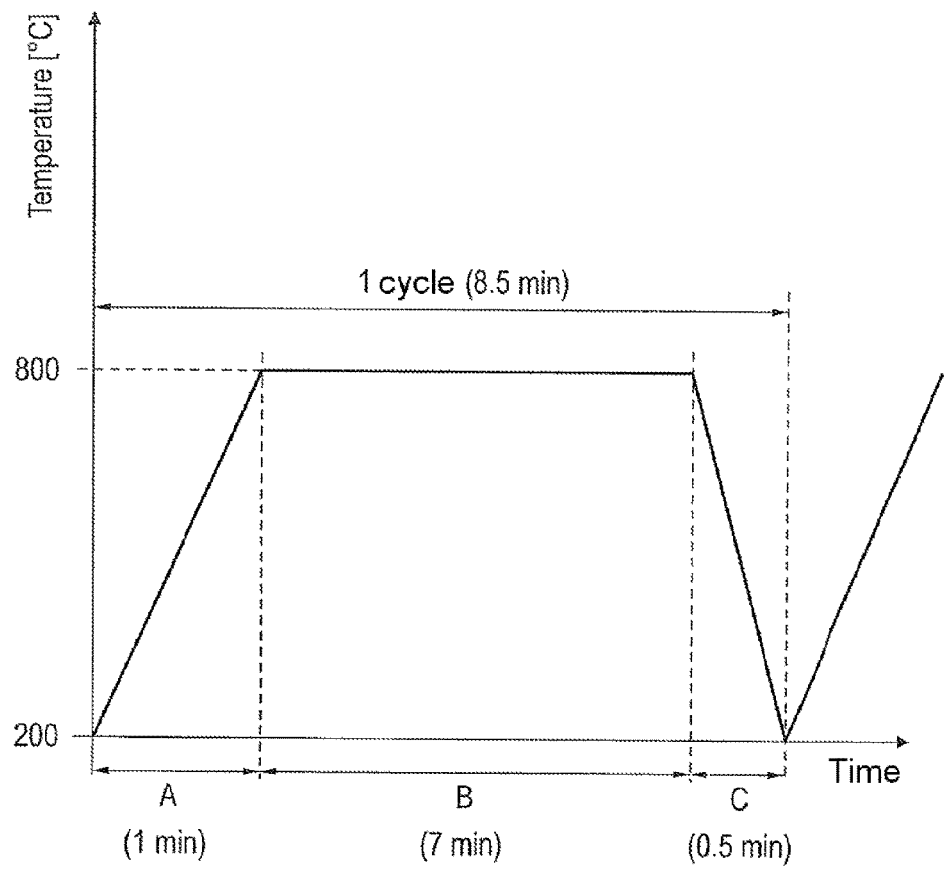
Figure 4:
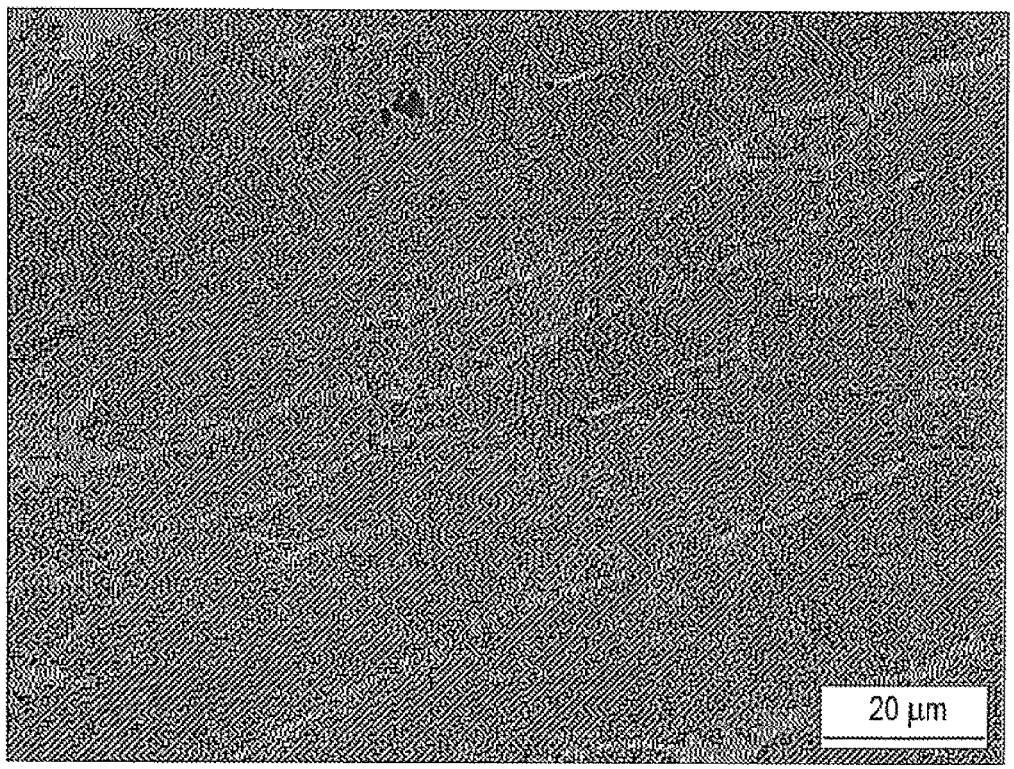
Figure 5:
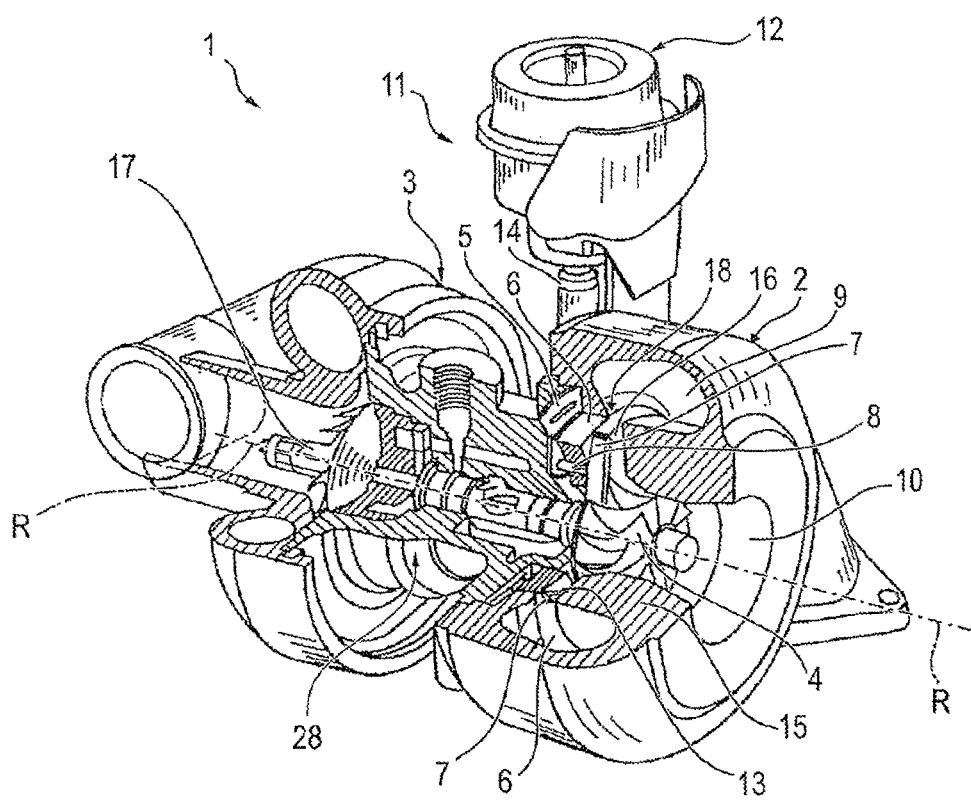

Further details, advantages and features of the present invention can be found in the following description of an example and of exemplary embodiments with reference to the drawing, in which:

FIG. 1 shows a scanning electron microscope image of a TiAl alloy according to an advantageous refinement, FIG. 2 shows a diagram illustrating the temperature profile during the production of the TiAl alloy from FIG. 1, FIG. 3 shows an overview of the temperature profile during a thermal cycle test, FIG. 4 shows a microscopic image of the TiAl alloy from FIG. 1 after a creep test, and FIG. 5 shows a schematic view of a turbocharger with a turbine rotor according to the invention.

EXAMPLE

A TiAl alloy according to an advantageous refinement of the invention was produced from the following elements by melting of the alloy elements to form an alloy material, heat treatment of the alloy material, and hot isostatic pressing of the alloy material (at a pressure of >172 MPa and a temperature of 1185±15° C. for a duration of 3 to 5 hours). The chemical analysis yielded the following values for the elements: C≤0.3 wt %, Si: 0.1-2.0 wt %, B: ≤0.2 wt %, Al: 32-35 wt %, Nb: 0.2-5.0 wt %, Cr: 0.2-3.0 wt %, V: ≤1.5 wt %, Mo: ≤1.0 wt %, in each case in relation to the overall weight of the alloy, with a remainder=Ti.

The above-specified TiAl alloy was used to produce a turbine rotor for a turbocharger by a conventional method. The turbine rotor produced in accordance with this example was characterized by a tensile strength $R_m$ of 440 MPa at 20° C. and a tensile strength $R_m$ of 420 MPa at 800° C. (measurement method for 20° C.: in accordance with ASTM E 8M/EN 10002-1; for elevated temperature: in accordance with EN 10002-5). The yield stress $R_p$ 0.2 (measured by standard methods) was 425 MPa at 20° C. and 340 MPa at 800° C. The elongation at fracture of the material (measured by standard methods) was 0.9% at 20° C. and 1.5% at 800° C. The hardness of the material (measured by the standard measurement method for determining Vickers hardness) was 350-450 HV10. The coefficient of thermal expansion (standard measurement method for dilatometer curve for the length expansion by means of dilatometer) was $9.0*10^{-6}$ $K^{-1}$ at 20° C. The coefficient of thermal conductivity (standard measurement method for electronic tachymeter; computer tachymeter with regard to thermal conductivity) was 17.5 W/mK at 20° C. The grain size of the material was 1 to 3 μm.

FIG. 1 shows a scanning electron microscope image of the example alloy according to the invention. It is possible to clearly see the lamellar structure of the alloy material and very good intermeshing of the phases of the alloy material at the microscopic level. A spacing between the lamellae is less than 1.5 μm, at least less than 1 min. The grain size of the material was 1 to 3 μm.

FIG. 2 is a diagram showing the temperature profile during the production of the TiAl alloy from FIG. 1, with the time being plotted on the X axis and the temperature in ° C. being plotted on the Y axis. In a first segment A, the alloy is heated to a temperature of 1260° C. within 2 hours, is then held at 1260° C. for 3 hours during segment B, and subsequently, in segment C, is cooled back down to room temperature (approximately 20° C.) at a cooling rate of 7 K/sec.

The turbine rotor produced from the material according to the invention was subjected to a validation test series which comprised the following tests:

creep test
thermal cycle test.

In these tests, the rotor was distinguished by excellent resistance to the acting forces, and in particular by good creep resistance. The material exhibited excellent oxidation resistance, high creep resistance and thermal fatigue performance. The high-temperature resistance was likewise very good.

Thermal Cycle Test:

The thermal cycle test was performed as illustrated in FIG. 3. In a first temperature segment A, the turbine rotor was heated from a start temperature of 200° C. to 800° C. within one minute by injection of hot air, was then held at 800° C. for 7 minutes, and was subsequently cooled down to 200° C. again within half a minute by means of a cooler fan. Said thermal cycle was performed for several thousand cycles, and the material was subsequently inspected. The turbine rotor according to the invention exhibited no crack formation or fractures after more than 500 cycles.

Creep Test:

To determine the creep resistance, the turbine rotor according to the invention was subjected to load of 150° C. for a duration of 1000 hours at 800° C. The elongation at fracture was in this case less than 3%.

FIG. 4 shows a microscopic view of the microstructure of the sample of the example alloy according to the invention that was subjected to the creep test described above. It is possible to see very uniform, statistical brightened areas which run at an angle of approximately 15° with respect to an imaginary horizontal line running from left to right in FIG. 4. The brightened areas represent grains of the example alloy. The substantially linear brightened areas show that virtually no irreversible damage or deformation has taken place. No defects as a result of creep of the material, or grain deformation, can be seen. The matrix structure was maintained. The alloy material according to the invention is thus distinguished by high creep resistance.

FIG. 5 shows a perspective view, partially in section, of an exhaust-gas turbocharger according to the invention. FIG. 5 illustrates the turbocharger 1 according to the invention, which has a turbine housing 2 and a compressor housing 3 which is connected to said turbine housing via a bearing housing 28. The housings 2, 3 and 28 are arranged along an axis of rotation R. The turbine housing is shown partially in section in order to illustrate the arrangement of a vane bearing ring 6 and a radially outer guide grate 18 formed by said vane bearing ring, which guide grate has a multiplicity of adjustable blades 7, with rotary axles 8, distributed around the circumference. In this way, nozzle cross sections are formed which are larger or smaller depending on the position of the adjustable blades 7 and via which the exhaust gas of an engine supplied via a supply duct 9 and discharged via a central connector pipe 10 impinges to a greater or lesser extent on the turbine rotor 4 according to the invention situated in the center on the axis of rotation R, in order, via the turbine rotor 4, to drive a compressor rotor 17 seated on the same shaft.

To control the movements or the position of the adjustable blades 7, an actuating device 11 is provided. Said actuating device may be of any desired design, but a preferred embodiment has a control housing 12 which controls the control movement of a plunger element 14 fastened thereto, such that the movement of said plunger element is converted into a slight rotational movement of an adjusting ring 5 situated behind the vane bearing ring 6. A free space 13 for the adjustable blades 7 is formed between the blade bearing ring 6 and an annular part 15 of the turbine housing 2. To ensure the presence of said free space 13, the vane bearing ring 6 has spacers 16.

In addition to the above written description of the invention, reference is hereby explicitly made, for additional disclosure thereof, to the diagrammatic illustration of the invention in FIGS. 1 to 5.

LIST OF REFERENCE SIGNS

1 Turbocharger
2 Turbine housing
3 Compressor housing
4 Turbine rotor
5 Adjusting ring
6 Vane bearing ring
7 Adjustable blades
8 Rotary axles
9 Supply duct
10 Axial connector
11 Actuating device
12 Control housing
13 Free space for adjusting blades 7
14 Plunger element
15 Annular part of the turbine housing 2
16 Spacer/spacer cam
17 Compressor rotor
18 Guide grate
28 Bearing housing
R Axis of rotation

The invention claimed is:

1. A TiAl alloy comprising the elements C, Si, B, Al and Ti, wherein a C fraction is ≤0.5 wt %, an Si fraction is 0.05-2.5 wt %, a B fraction is ≤0.4 wt % and an Al fraction is 25-43 wt %, in each case in relation to the total weight of the alloy, and wherein the TiAl alloy has an average grain size of 1 to 3 μm.

2. The TiAl alloy as claimed in claim 1, wherein the C fraction is ≤0.4 wt %, the Si fraction is 0.08-2.2 wt %, the B fraction is ≤0.3 wt % and the Al fraction is 28-39 wt %, in each case in relation to the total weight of the alloy.

3. The TiAl alloy as claimed in claim 1 furthermore comprising Nb, wherein an Nb fraction is 0.1-8.0 wt % in relation to the total weight of the alloy.

4. The TiAl alloy as claimed in claim 1, furthermore comprising at least one of Cr and V and Mo, wherein in the case of presence of Cr a Cr fraction is 0.1-4.0 wt %, in the case of presence of V a V fraction is ≤2.0 wt %, and in the case of presence of Mo an Mo fraction is ≤1.4 wt %, in each case in relation to the total weight of the alloy.

5. The TiAl alloy as claimed in claim 1, wherein the alloy is composed of Ti, Al, C, Si, B, Al, Mo, Cr, V and Nb, wherein a C fraction is ≤0.5 wt %, an Si fraction is 0.05-2.5 wt %, a B fraction is ≤0.4 wt %, an Al fraction is 25-43 wt %, an Nb fraction is 0.1-8.0 wt %, a Cr fraction is 0.1-4.0 wt %, a V fraction is ≤2.0 wt %, and a Mo fraction is ≤1.4 wt %, in each case in relation to the total weight of the alloy, with a remainder=Ti.

6. The TiAl alloy as claimed in claim 1, wherein the alloy is subjected to a heat treatment and hot isostatic pressing.

7. The TiAl alloy as claimed in claim 1, wherein the alloy has a lamellar structure and a spacing between the lamellae is ≤1.5 μm.

8. A turbocharger component, composed of a TiAl alloy as claimed in claim 1.

9. A turbocharger comprising at least one component, which is composed of a TiAl alloy comprising the elements C, Si, B, Al and Ti, wherein a C fraction is ≤0.5 wt %, an Si fraction is 0.05-2.5 wt %, a B fraction is ≤0.4 wt % and an Al fraction is 25-43 wt %, in each case in relation to the total weight of the alloy, and wherein the TiAl alloy has an average grain size of greater than 2 μm and/or a lamellar structure, wherein a spacing between the lamellae is ≤1.5 μm.

10. The turbocharger as claimed in claim 9, wherein in the TiAl alloy, the C fraction is ≤0.4 wt %, the Si fraction is 0.08-2.2 wt %, the B fraction is ≤0.3 wt % and the Al fraction is 28-39 wt %, in each case in relation to the total weight of the alloy.

11. The turbocharger as claimed in claim 9, wherein the TiAl alloy furthermore comprises Nb, wherein an Nb fraction is 0.1-8.0 wt %, in relation to the total weight of the alloy.

12. The turbocharger as claimed in claim 9, wherein the TiAl alloy furthermore comprises Cr and/or V and/or Mo, wherein a Cr fraction is 0.1-4.0 wt %, and/or a V fraction is ≤2.0 wt %, and/or an Mo fraction is ≤1.4 wt %, in each case in relation to the total weight of the alloy.

13. The turbocharger as claimed in claim 9, wherein the TiAl alloy is composed of Ti, Al, C, Si, B, Al, Mo, Cr, V and Nb, wherein a C fraction is ≤0.5 wt %, an Si fraction is 0.05-2.5 wt %, a B fraction is ≤0.4 wt %, an Al fraction is 25-43 wt %, an Nb fraction is 0.1-8.0 wt %, a Cr fraction is 0.1-4.0 wt %, a V fraction is ≤2.0 wt %, and a Mo fraction is ≤1.4 wt %, in each case in relation to the total weight of the alloy, with a remainder=Ti.

14. The turbocharger as claimed in claim 9, wherein the TiAl alloy is subjected to a heat treatment and hot isostatic pressing.

15. A method for producing a TiAl alloy as claimed in claim 1, comprising the steps:
   melting the alloy elements to form an alloy material,
   subjecting the alloy material to heat treatment, and
   subjecting the alloy material to hot isostatic pressing.

16. The method as claimed in claim 15, wherein the heat treatment comprises the following steps:
   heating the alloy material to approximately 1260° C. within two hours,
   holding the alloy material at a temperature of approximately 1260° C. for three hours, and
   cooling the alloy material in a nitrogen inert gas atmosphere to a temperature of 650° C. with a cooling rate of 7 K/sec.

17. The TiAl alloy as claimed in claim 1, furthermore comprising Nb, wherein an Nb fraction is 0.15-6.5 wt % in relation to the total weight of the alloy.

18. The TiAl alloy as claimed in claim 1, furthermore comprising at least one of Cr and V and Mo, wherein in the case of presence of Cr a Cr fraction is 0.15-3.5 wt %, in the case of presence of V a V fraction is ≤1.7 wt %, and in the case of presence of Mo an Mo fraction is ≤1.2 wt %, in each case in relation to the total weight of the alloy.

* * * * *